United States Patent [19]

Sperka et al.

[11] Patent Number: 4,813,087

[45] Date of Patent: Mar. 21, 1989

[54] KITCHEN SINK UNIT WITH REFUSE DISPOSAL OPENING

[75] Inventors: Adolf Sperka, Murg/Baden; Wolfgang Kemmerling, Säckingen, both of Fed. Rep. of Germany

[73] Assignee: Niro-Plan AG, Zug, Switzerland

[21] Appl. No.: 111,011

[22] Filed: Oct. 20, 1987

[30] Foreign Application Priority Data

Nov. 20, 1986 [DE] Fed. Rep. of Germany ....... 3639723

[51] Int. Cl.[4] .......................... A47J 47/20; E03C 1/01; A47L 19/02

[52] U.S. Cl. ............................................ 4/629; 4/631; 4/656

[58] Field of Search ............ 4/654, 658, 657, 631–636, 4/637, 661, 619, 629, 630, 638, 639, 643, 656, 465, 467

[56] References Cited

U.S. PATENT DOCUMENTS

| | | | |
|---|---|---|---|
| 210,572 | 12/1878 | Slevin | 4/629 X |
| 2,063,243 | 12/1936 | Groeniger | 4/637 |
| 2,172,188 | 9/1939 | Cather | 4/629 |
| 2,672,621 | 3/1954 | Drain | 4/654 |
| 3,983,583 | 10/1976 | Herman et al. | 4/631 |
| 4,624,020 | 11/1986 | Abderhalden et al. | 4/637 |
| 4,689,840 | 9/1987 | Mück et al | 4/629 |

FOREIGN PATENT DOCUMENTS

| | | | |
|---|---|---|---|
| 36361 | 9/1981 | European Pat. Off. | 4/629 |
| 3501443 | 9/1985 | Fed. Rep. of Germany . | |
| 3410103 | 10/1985 | Fed. Rep. of Germany . | |
| 4528 | 9/1981 | France | 4/637 |

*Primary Examiner*—Joseph J. Hail, III
*Attorney, Agent, or Firm*—Frishauf, Holtz, Goodman & Woodward

[57] ABSTRACT

To provide a single structured sink unit in which, selectively, household refuse can be separated into garbage (which is biodegradable) and trash (which is not biodegradable), the sink unit is formed with two aligned openings (4, 5) positioned front-to-back. The second opening may have, selectively, a refuse chute (11) inserted therein or a basket (12), for example for cleaning supplies or the like. The openings are alignable with either separate refuse containers (9, 10) or a single container which is compartmentalized, for selective placement of separated trash and garbage or for unseparated refuse.

13 Claims, 4 Drawing Sheets

KITCHEN SINK UNIT WITH REFUSE DISPOSAL OPENING

The present invention relates to a sink unit, and more particularly to a household kitchen sink unit, having a refuse disposal opening adjacent the sink unit, connectable by a chute to a refuse receptacle.

BACKGROUND

It is sometimes desirable to provide sink units which have, as an integral part thereof, a shelf area or the like which is formed with a refuse disposal opening, which can be connected to a chute, which, in turn, terminates in a refuse receptacle or wastebasket. This has the advantage that it is not necessary to bend down, open a cabinet door, for example, and lift a cover off a trash or garbage can. The sink unit includes a collar or ring which surrounds the refuse disposal opening, thus insuring that water running into the sink bowl or basin itself does not run over into the refuse opening. A cover or closure element may be provided to insure that no splashing or spray water reaches the opening. The collar additionally provides a holding or locating function for a cover or closure or, if desired, for inserts which could be placed into the opening.

The referenced German Patent Disclosure Documents DE-OS 34 10 103 and 35 10 443 describe sinks which have openings adjacent the sink bowl or basin element. The constructions there shown are complex and, hence, result in an expensive unit. The sink unit of German 35 14 443, especially, requires a chute unit which is welded to the sink itself, into which chute unit a chute element as such can be inserted. The chute element is removable. Because of the overall construction, the units are heavy and require a multi-element support frame and holding construction in order to retain a refuse container receiving the refuse from the chute.

THE INVENTION

It is an object to provide a sink unit which is closely matched to the requirements of household use to provide, at the same time, the functions of a sink and refuse removal while, additionally, being versatile and readily adaptable to different utilization forms, without change in manufacturing technology, or manufacturing tools; and which is simple to make and of light weight, so that it can be easily manufactured and installed, for example in a standard sink cabinet.

Briefly, the sink unit is formed with an auxiliary refuse opening, of at least approximately similar size and shape of the refuse opening which may already be provided. The auxiliary refuse opening is adapted to receive, selectively, either a basket or receptacle element, or a chute element. The basket or receptacle element on the one hand, or the chute element on the other, are shaped for insertion and retention in the auxiliary opening.

The arrangement has the advantage that the sink can be used, selectively, as desired. Some households like to separate garbage from trash. "Garbage" is usally referred to as refuse substances which are biodegradable and can be composted; "trash" is defined as that portion of refuse which cannot be biodegraded, but must be disposed of otherwise, which may include recycling of components. Together, "garbage" and "trash" form "refuse". In some households, thus, it is desired to separate garbage and trash, the garbage to be separately collected from trash, for subsequent composting; in other households, where no such separation is carried out, the second opening is a suitable place to retain a basket or receptacle to hold, for example, cleaning utensils, cleaning substances, and the like. The chute element, as well as the basket or receptacle element, each, are readily removable from the auxiliary opening and, as required, selectively reinsertable from the top through the auxiliary opening. The sink unit, thus, is universally applicable for households which are organized to separate garbage from trash, and other households which are not so organized, while providing for those households a convenient place for cleaning supplies and implements.

The sink arrangement in accordance with the present invention has the advantage to ideally solve a problem since one and the same unit can be used by households which have entirely different ways of handling refuse. If the auxiliary opening is not needed for separated garbage, a receptacle or basket for cleaning supplies and the like can be readily inserted. Such cleaning supplies, which are customarily used to clean the sink unit, for dishwashing, for cleaning of work areas or of stove units, frequently are stored in a sink cabinet beneath the sink itself. To obtain access to the cleaning supplies, it is thus necessary, each time, to bend down, open a door, remove the supplies, close the door, and repeat the operation when the cleaning supplies have to be stored again. All this can be easily eliminated by placing a basket or receptacle into the second or auxiliary opening where the cleaning supplies are readily accessible, without, however, interfering with the overall appearance of the sink or the kitchen sink area.

For other households, where stress is laid on separating refuse into trash and garbage, a second chute for garbage is readily insertable into the auxiliary opening. Preferably, the first opening and the auxiliary opening are of the same size and shape. This permits interchangeability of chute units or, if desired, change-over in the mode of handling refuse by, for example, replacing a receptacle or basket with a second chute terminating in a garbage container, bag or the like, without requiring manufacture of elements not already made and in production with the sink originally equipped with the basket. The chutes, thus, will also be identically interchangeable and, thus, can be supplied at low cost as retrofit or auxiliary items. The sink unit, thus, can be matched optimally to the different requirements of individual households, and their preferences of refuse disposal.

The arrangement has the further advantage that, selectively, the basket or the chute is readily removable from the respective auxiliary opening, being constructed as insertion elements, for example snap or push-in elements, so that a separate welded chute is no longer necessary—in contrast to the prior art structure in which the chute was welded. Thus, the quantity of material used, as well as the ease of installation of the sink of the present invention is substantially improved over structures known in the prior art.

The first opening and the auxiliary openings can be located as desired; they may be located adjacent each other or, in accordance with a preferred feature of the invention, utilize the area for installation of the sink in a direction towards the building or kitchen wall, that is, to place the two openings one behind the other of the sink unit.

In accordance with a feature of the invention, the sink unit can be constructed to be reversible, that is, selectively rotatable by 180°. This permits construction of a sink unit which has two basins or bowls, or which has a basin or bowl and a drip pan. In such arrangements, the drip pan can be placed, as desired, at the right side or at the left side of the basin or bowl, so that the refuse openings then will be placed, selectively, at the left side and right side of the sink basin. The arrangement, thus, is versatile and can be easily matched to the available space in a specific kitchen layout. Preferably, the two refuse openings are located symmetrically with respect to the longitudinal axis of the sink. Accessibility and use of the openings—for storage of cleaning supplies or, alternatively, disposal of garbage, is independent of the installation position of the sink unit.

Preferably, the openings should be large enough to receive refuse of relatively large size, such as tin cans or the like. Accordingly, it is desirable that the refuse openings extend from an edge portion of the sink unit to almost the center line thereof.

The receptacle for the refuse—trash or garbage, or both—preferably is not secured to the sink unit as such, but is placed loose beneath the sink unit, preferably in a kitchen cabinet structure or the like.

Receptacles for kitchen sinks are known which include two single containers, located one behind the other, and supported, for example, on a pull tray or the like to permit removal of the containers, together, by pulling them outwardly. The containers are closed off by covers which, as they are pulled outwardly, automatically flip or pivot or tilt upwardly. In accordance with a preferred embodiment of the invention, the sink unit can be combined with containers of this type, by adapting the containers with an upwardly extending frame or collar unit, shaped to surround the respective chutes of the sink unit. The cover is formed with a through-opening beneath the chute opening. The cover is so arranged that it has pre-formed break lines closing off the cover in the region of the auxiliary chute, for permitting breaking away of the cover portion if a second, or auxiliary chute is installed.

This arrangement has the advantage that not only the sink unit, but also the portion which is needed to then handle the trash or refuse can be readily matched to the specific preferences or requirements of respective households, by transferring the selective adaptability to separation of refuse into trash and garbage, or non-separation also to the refuse or receptacle or receptacles. For example, the sink unit with the two staggered openings, one behind the other, can be so used that the cover with the opening is placed to match the chute of the rearmost opening, to receive refuse thrown therein, whereas the forward portion of the receptacle, or the forward receptacle element, is externally accessible, for example by lifting the cover from the outside. In such a mode, a basket for cleaning supplies is preferably inserted in the forwardly placed opening in the sink unit. Selectively, if the break lines are broken off, the cover unit can be opened to receive refuse also from the top.

DRAWINGS

DETAILED DESCRIPTION

Figure 1:
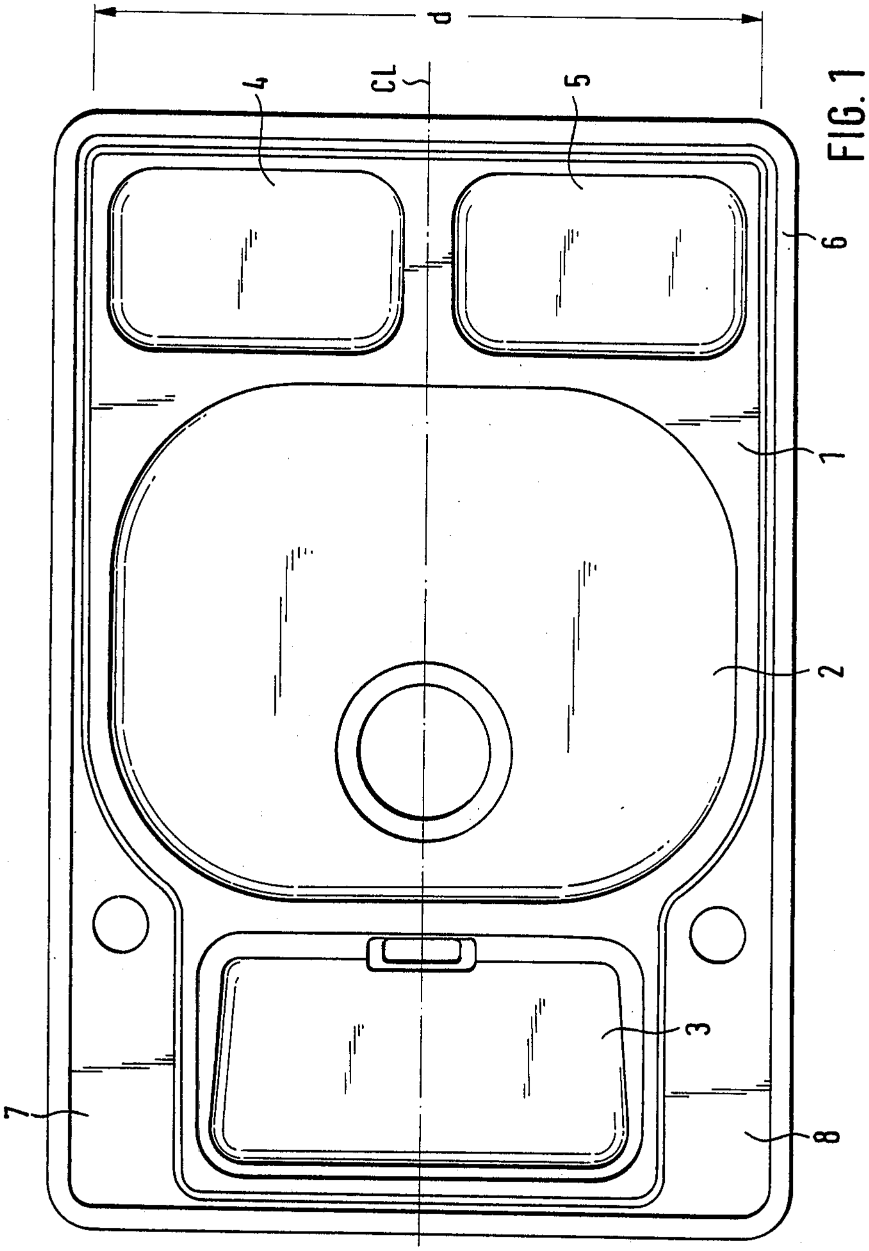
FIG. 1 is a top view of the sink unit.
Figure 2:
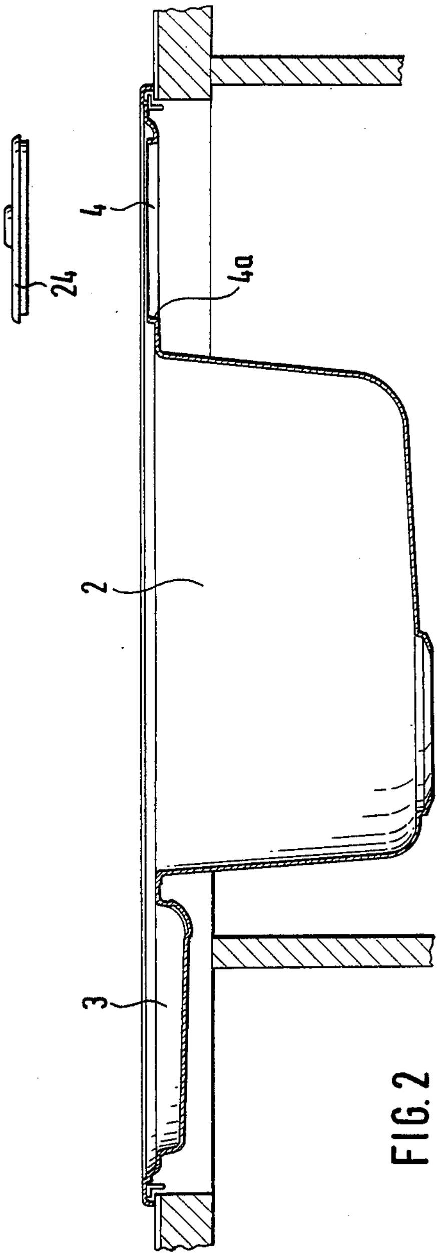
FIG. 2 is a longitudinal cross-sectional view through the sink unit of FIG. 1.

The sink unit 1—see FIGS. 1 and 2—has a larger basin or bowl 2 and, longitudinally adjacent thereto, a smaller flatter area, which can be a rinsing or drip tray area, or a shallow bowl or basin, as desired.

In accordance with a feature of the invention, a first opening 4 together with an auxiliary opening 5 is formed in the top of the sink unit 1 at the side opposite the shallow basin or drip tray, for short, depressed region 3 with respect to the sink bowl or basin 2. The openings 4, 5 are identical in size and shape, and located, one behind the other, with respect to the length dimension of the sink. They extend over almost half the width or depth dimension d of the sink area of the sink unit. They are placed symmetrically with respect to a longitudinal center line CL of the sink unit. The sink unit, as is customary, is formed with an upstanding rim 6, which can fit against the top plate of a kitchen cabinet.

The two basins 2 and 3, as well as the openings 4, 5, are surrounded by the customary rim 6 which may terminate in a slightly inclined surface directed towards the depressed sink regions 2, 3 to provide for flow of water into the sink regions and such drains as are provided therein. Two regions 7, 8 are located adjacent the second or smaller drip or sink area 3, for example to permit mounting of faucet structures or the like—not shown—for instance by punching suitable openings in either region, as required by customer installations. Other openings, to attach stoppers, sprays, or the like, may be formed in the respective regions 7, 8.

The openings 4, 5 are surrounded by collars, of which only collar 4*a* is visible in FIG. 2. The collar 4*a* is so constructed that the contour of the respective openings 4, 5 is formed by an upwardly bent or bulged rim, extending from above the plane or flat area surrounding the opening. This collar or rim around the opening is provided to prevent water which may have splashed on the region adjacent the openings from running into the respective openings 4, 5. The collar may be formed as a bead or ridge on a shelf portion surrounding the respective opening 4, 5.

Figure 3:
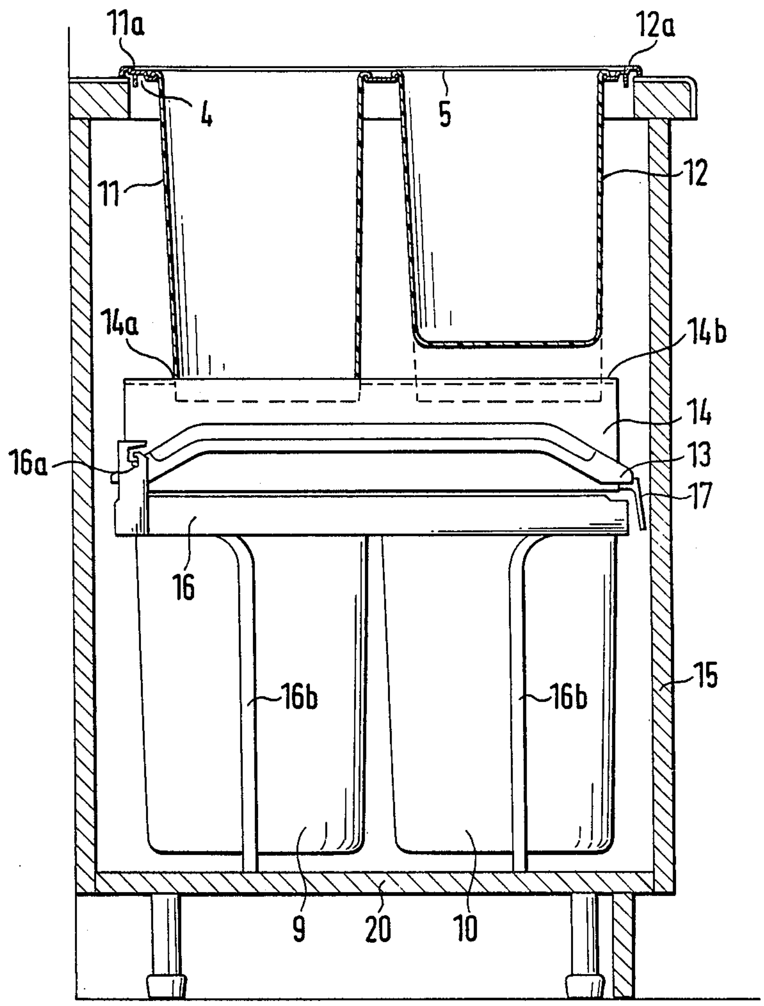
FIG. 3 is a vertical left-side cross-sectional view through the sink unit in the region of refuse openings, with inserted push-in elements, and including receptacles located in a sink cabinet.
Figure 4:
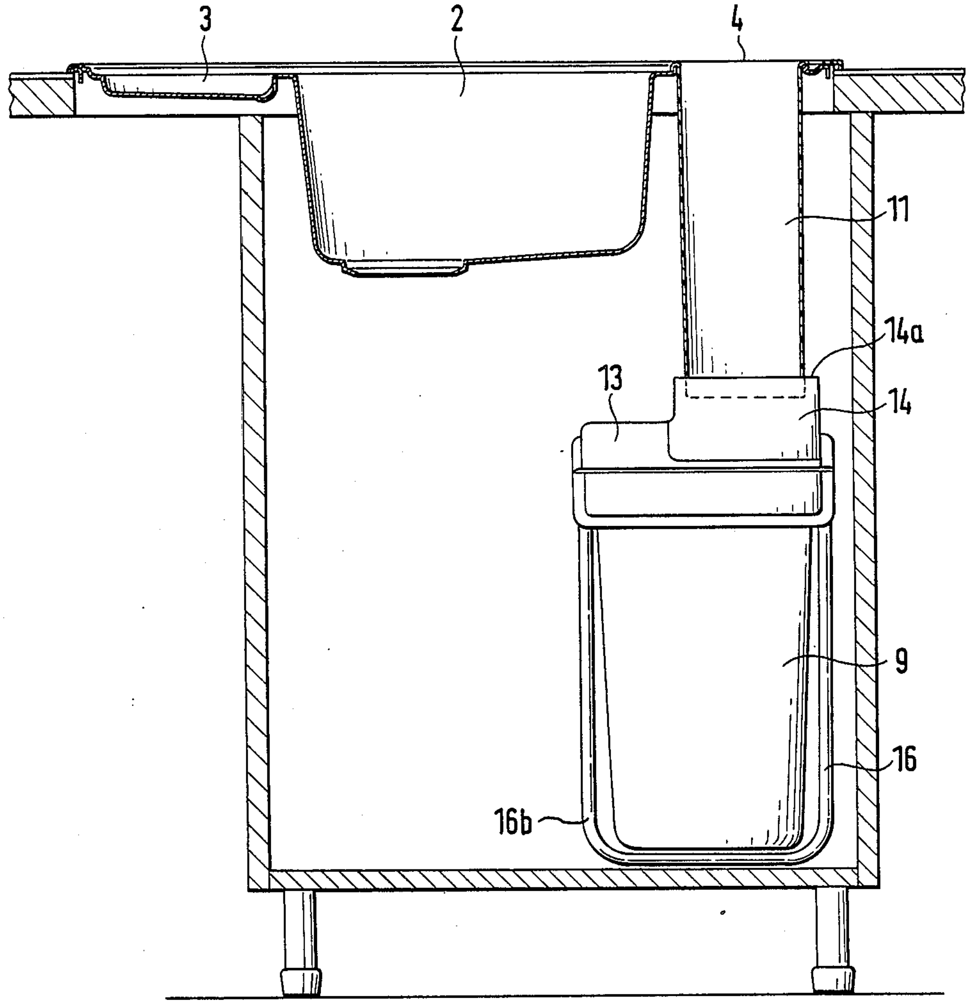
FIG. 4 is a longitudinal cross-sectional view through the arrangement of FIG. 3.

FIGS. 3 and 4 illustrate the sink unit installed in a kitchen cabinet, and combined with suitably matched and fitter refuse containers 9, 10. The openings 4, 5, each, may, selectively, have either a chute 11 or a basket or receptacle 12 inserted therein. Both the chute 11 as well as the basket 12 can be inserted into the respectively selected opening 4, 5 from the top, to hang therein. They are formed, at their upper edge, with a horizontally extending flange or rim 11*a*, 12*a*, respectively, with which they engage against the edge or rim of the opening or, if desired, overlap the respective bead or ridge surrounding the opening, such as the ridge 4*a*. The chute 11, as well as the basket 12 may be made of plastic or some other material which is lightweight, can be easily cleaned, and readily shaped.

The basket 12 is closed on the bottom and extends to just above a cover 13 which is common to refuse receptacles 9, 10. The chute 11 extends further downwardly and projects into an opening in the cover 13. An insert frame 14, which can be pushed onto the opening in the cover 13, or snapped theron, and which extends upwardly, has an opening 14a to receive the chute 11. At the forward end of the frame element, it is formed with break-off lines or points 14b, to permit breaking out an opening in the cover which, preferably, is identical to the opening 14a, so that, if desired, a chute identical to chute 11 (FIG. 3) can be inserted in the opening which, as shown in FIG. 3, retained the basket 12, to permit insertion of the chute into the cover frame or cover collar 14 on the cover 13.

The receptacle 9, thus, can receive refuse through the opening 4 in the sink unit and, for example, may form a garbage container for garbage such as peelings, fruit pits, or the like, in other words, biodegradable materials; the forward refuse container 10 is accessible via a door 15 closing off the front of the kitchen sink unit cabinet, shown only schematically at 20. The container 10, then, can be used for trash.

As clearly seen in FIGS. 3 and 4, the refuse containers 9, 10 are not secured to the sink unit but, rather, can be placed on the bottom of the cabinet 20 or, as shown, retained on a frame 16 which, in turn, is supported on the kitchen cabinet 20. This substantially facilitates the manufacture of the sink unit and renders it universally applicable, and easily installed. A single, divided container may be used.

The refuse containers 9, 10, as shown, are supported on a frame 16 having legs 16b which, for example, are screw-connected or otherwise held in flanges or suitable brackets, secured to the sink cabinet 20. The frame 16 retains a pull-out slide 17 which, in turn, supports the receptacles 9, 10 themselves so that, upon opening of the door 15, the containers 9, 10 can be shifted towards the right or depth, outside the front of the cabinet 20. The frame 16 additionally includes a pivot support 16a for the cover 13. The pull-out slide 17 is so coupled to the cover 13, that, upon pulling out the receptacles 9, 10, the cover lifts off, and upwardly from the respective receptacles 9, 10. Thus, the pull-out slide 17 can be coupled to the door 15 of the cabinet so that, upon opening of the door, the forward refuse container 10 will be automatically accessible.

Suitable top covers, of which only one is shown at 24 (FIG. 2) can be provided, of course, to close off the openings 4, 5, if they are equipped with a chute.

Basically, the sink of the present invention permits use in combination with the refuse containers 9, 10 in such a way that it is optimally matched to different operating modes and operating styles of the user with respect to refuse removal, without, in any way, requiring change of the sink unit structure as such. Merely by providing respectively adapted inserts—chutes 11 or baskets 12—it is possible to vary the use of the sink without any expensive additional structures or adaptations. No welding or installation is necessary, and the attachment of the sink unit to an existing cabinet can be in accordance with any well known standard construction—not shown in the drawings since it can be routine. Combination with readily available commercial refuse containers is possible, which are available as standard kitchen equipment; it is only necessary to modify the region of the cover 13 to provide for an opening if two chutes are used; if the cover is of plastic, it can be cut with a knife unless it is desired to replace the cover with pre-scored break-away lines or the like. Thus, the combination sink unit and refuse receptacle can be matched to any required or desired mode of use.

Various changes and modifications may be made within the scope of the inventive concept.

We claim:

1. Kitchen sink unit, for installation in a cabinet (20), comprising a unitary structure having at least one sink bowl or basin (2), a shelf region adjacent the sink bowl or basin, and a first refuse opening (4) and a second, auxiliary refuse opening (5) formed in the shelf region, said first and second openings having substantially the same size and shape, a refuse container (9, 10) beneath at least one of the refuse openings, and a first chute (11) fitting into and leading from an arbitarily selected one of the refuse openings to the container, and wherein the other of said refuse openings is adapted to receive a selected one of the following interchangeable insertable elements a second chute (11) and a basket or receptacle (12), thereby adapting said sink for mounting in either of two orientations in said cabinet such that said first and second openings may be positioned on either of a first or a second side of said sink, and for use in separation of household refuse into biodegradable and non-biodegradable components.

2. The unit of claim 1, wherein said first refuse opening (4) and said auxiliary refuse opening (5) are located in line with respect to each other, and transversely to a longitudinal center line of the sink unit, one behind the other.

3. The unit of claim 2, wherein said first opening (4) and said auxiliary opening (5) are located symmetrically with respect to said center line (CL).

4. The unit of claim 2, wherein the first opening (4) and the auxiliary opening (5) together extend over just slightly less than a width dimension (d) of the sink unit, measured substantially perpendicularly to said longitudinal center line.

5. The unit of claim 2, wherein said refuse container comprises refuse container means (9, 10) defining separate refuse container compartments arranged one behind the other;

a common cover or closure (13) covering said refuse container means and automatically raisable from the refuse container means upon opening of a door (15) of said cabinet (20);

and further including an upwardly extending frame (14) extending from the cover or closure (13), said upwardly extending frame (14) being formed with an upper contoured shape dimensioned and positioned to surround said chutes (11) inserted in each of said first and auxiliary openings (4, 5); and break-away scores (14b) positioned in said cover in alignment with the contoured region where each chute is surrounded by said frame, for selective formation of an opening in said cover for passage of refuse through the respective chute and into said refuse container.

6. The unit of claim 5, wherein said cover is formed with an opening in alignment with one of said chutes.

7. The unit of claim 6, wherein the opening (14a) is formed in the portion of the cover (13) which is in alignment with the one of said chutes (11) inserted in that one (4) of the openings which forms the rearward opening when the unitary structure is installed in said cabinet;

and wherein the break-away scores or marks (14b) in the cover are positioned in alignment with that one (5) of the openings (4, 5) which is positioned at a forward location of the sink unit, when installed in a cabinet, and in alignment with the chute inserted in said forwardly positioned opening (5).

8. The unit of claim 6, wherein the frame (14) comprises an individual unit, separably connectable with said cover (13).

9. The unit of claim 1, wherein two refuse container means (9, 10) are located beneath said first and auxiliary openings (4, 5), and supported in said cabinet (20) independently of said unitary structure.

10. The unit of claim 1, further including a closing cover (24) for at least said first refuse opening.

11. The unit of claim 1, in combination with the second chute inserted in said auxiliary refuse opening.

12. The unit of claim 1, in combination with the basket or receptacle (12) inserted in said auxiliary refuse opening (5).

13. The unit of claim 1, wherein the shelf region adjacent said first opening and adjacent said auxiliary opening (5) is formed with a ridge or rim or bead (4*a*) surrounding the respective opening (4, 5);

and wherein said insectable element includes a collar overlapping said ridge or rim or bead for holding the respective element in position while preventing ingress of water into the respective opening, or between the shelf region and said respective element.

* * * * *